(12) United States Patent
Wilkes et al.

(10) Patent No.: US 9,378,051 B1
(45) Date of Patent: Jun. 28, 2016

(54) SYSTEMS AND METHODS FOR PERFORMING SCHEDULING FOR A CLUSTER

(71) Applicant: Google Inc., Mountain View, CA (US)

(72) Inventors: John Wilkes, Palo Alto, CA (US); Todd Pu-Tse Wang, Saratoga, CA (US); Walfredo Cirne, Palo Alto, CA (US); David Oppenheimer, San Francisco, CA (US); Brian Grant, San Carlos, CA (US); Jason Hickey, Santa Clara, CA (US); Kai-Peter Backman, Helsinki (FI); Joseph Hellerstein, Seattle, WA (US); David Bort, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/985,584

(22) Filed: Dec. 31, 2015

Related U.S. Application Data

(60) Continuation of application No. 14/864,130, filed on Sep. 24, 2015, which is a division of application No. 13/788,195, filed on Mar. 7, 2013, now Pat. No. 9,229,774.

(60) Provisional application No. 61/671,395, filed on Jul. 13, 2012.

(51) Int. Cl.
*G06F 9/46* (2006.01)
*G06F 9/48* (2006.01)

(52) U.S. Cl.
CPC ............ *G06F 9/4818* (2013.01); *G06F 9/4881* (2013.01)

(58) Field of Classification Search
None
See application file for complete search history.

(56) References Cited

U.S. PATENT DOCUMENTS

| | | |
|---|---|---|
| 2007/0005755 A1 | 1/2007 | Humphries |
| 2007/0294697 A1 | 12/2007 | Theimer et al. |
| 2009/0282411 A1 | 11/2009 | Carteri et al. |
| 2013/0067493 A1 | 3/2013 | Dion et al. |

*Primary Examiner* — Dong Kim
(74) *Attorney, Agent, or Firm* — Lerner, David, Littenberg, Krumholz & Mentlik, LLP (57) ABSTRACT

Multiple scheduler verticals can allocate tasks to resources that are shared by the scheduler verticals. Information regarding a state of each resource may be stored in memory accessible by the multiple scheduler verticals, and a processor updates the information. The scheduler verticals schedule events to be performed by any of the resources, and submit updates to reflect the scheduled events in the information. In the event of conflicting events, an update corresponding to only one of the conflicting events is committed. Moreover, disruptions may be preplanned and scheduled so as to minimize impact on scheduled tasks.

7 Claims, 7 Drawing Sheets

SYSTEMS AND METHODS FOR PERFORMING SCHEDULING FOR A CLUSTER

CROSS-REFERENCE TO RELATED APPLICATIONS

The present application is a continuation of U.S. patent application Ser. No. 14/864,130, filed Sep. 24, 2015 which is a divisional of U.S. patent application Ser. No. 13/788,195, filed Mar. 7, 2013, which claims the benefit of the filing date of U.S. Provisional Patent Application No. 61/671,395 filed Jul. 13, 2012, the disclosure of which is hereby incorporated herein by reference.

Figure 1:
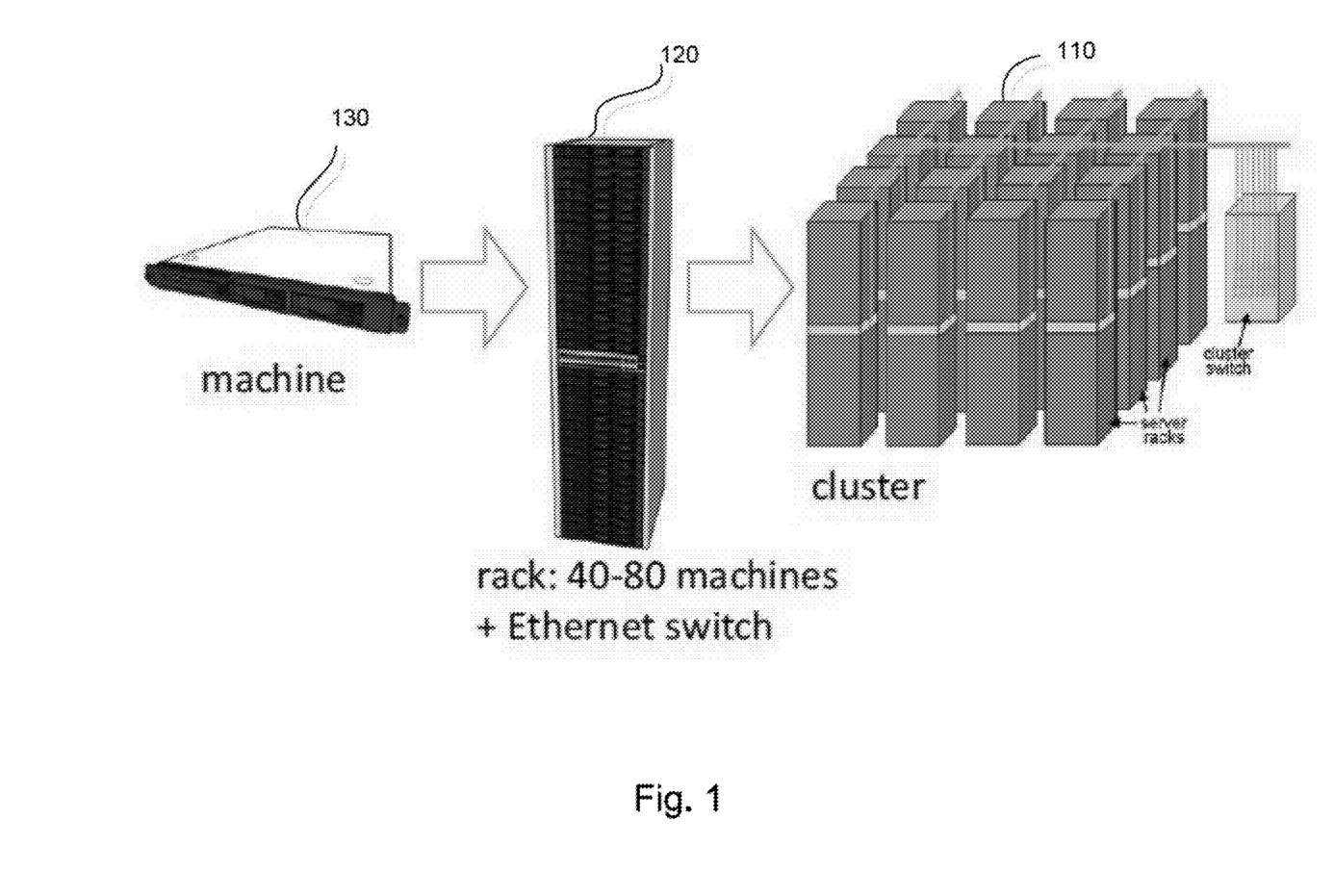
FIG. 1 is a pictorial diagram of a computing cluster.

A cluster may refer to a group of computing devices. For example, FIG. 1 illustrates a cluster 110 including a plurality of server racks 120. Each server rack 120 may further include a plurality of machines or servers 130. For example, one rack 120 may hold approximately 40-80 machines 130. The cluster 110 may therefore include thousands, tens of thousands, or more machines 130. A cluster switch may be used for communication among machines 130 in the cluster 110. According to some examples, the cluster switch may be a set of switches.

A cell may reside within a cluster, or may span all or parts of multiple clusters, and may include many computing machines. Each cell includes a central manager, and each computer has a local agent. Users submit jobs to a cell, each job comprising one or more tasks. For example, each job may include thousands of tasks, which may run from anywhere between a few seconds to several years. The jobs and tasks may have requirements, such as resource shape (e.g., how much processing capability, memory, etc. is or should be used to perform the job or task), constraints (e.g., machine type, external Internet Protocol address), software to run, or preferences.

Managing a cluster, such as the cluster 110, includes providing for testing, repairs, upgrades, downgrades, scheduling, restoring, monitoring, recovering from crashes, etc. Such management may require that the cluster or at least a portion thereof stop running for a period of time. As a result, jobs or tasks may be impacted and users may see a disruption in service.

SUMMARY

One aspect of the disclosure provides a framework in which multiple scheduler verticals can allocate tasks to resources that are shared by the scheduler verticals. A system may include a set of two or more scheduler verticals adapted to receive requests for work to be performed by one or more of a plurality of machines, a memory storing information regarding a state of each of the plurality of machines, and a processor for use in updating the information. The scheduler verticals may be adapted to retrieve copies of the information, schedule events to be performed by any of the plurality of machines, and submit updates to reflect the scheduled events in the information. If multiple scheduler verticals schedule conflicting events for a given machine, an update submitted by one of such scheduler verticals may be committed and the remaining scheduled events are rejected.

A method of concurrently scheduling, using a plurality of scheduler verticals, events to be performed by one or more machines, may include receiving requests for work to be performed, the work including one or more events. The method may further include receiving information regarding a state of the one or more machines, scheduling, using the plurality of scheduler verticals, the one or more events on the one or more machines, and submitting the scheduled events to memory. Moreover, a processor may determine whether conflicting events are submitted to memory, if so, may commit one of the conflicting events to memory and rejecting the remaining conflicting events.

Another aspect of the disclosure provides a system and method for scheduling planned disruptions so as to reduce the impact on scheduled tasks. A system may include a set of one or more job scheduler verticals for scheduling requested tasks, a set of one or more disruption scheduler verticals for scheduling planned disruptions, and a calendar accessible by the set of job scheduler verticals and set of the disruption scheduler verticals, the calendar including scheduled tasks and disruptions entered by at least some job scheduler verticals and at least some disruption scheduler verticals. The set of disruption scheduler verticals is programmed to access the calendar, identify candidate timeslots for scheduling the disruptions, determine whether existing tasks are scheduled in the candidate timeslots, determine which of the candidate timeslots would have the least impact on other uses of the resource if the disruption was scheduled therein, and schedule the disruption in the candidate timeslot having the least impact. The set of job schedulers is programmed to reschedule tasks that conflict with the scheduled disruptions.

A method for scheduling disruptions for a resource may include scheduling requested tasks in a calendar using one or more job scheduler verticals, and scheduling planned disruptions in the calendar using one or more disruption scheduler verticals. Scheduling the planned disruptions may include accessing the calendar, identifying candidate timeslots for scheduling the disruptions, determining whether existing tasks are scheduled in the candidate timeslots, determining which of the candidate timeslots would have the least impact on the resource if the disruption was scheduled therein, and scheduling the disruption in the candidate timeslot having the least impact. If the scheduled disruption conflicts with an existing task, the existing task may be rescheduled.

DETAILED DESCRIPTION

Figure 2:
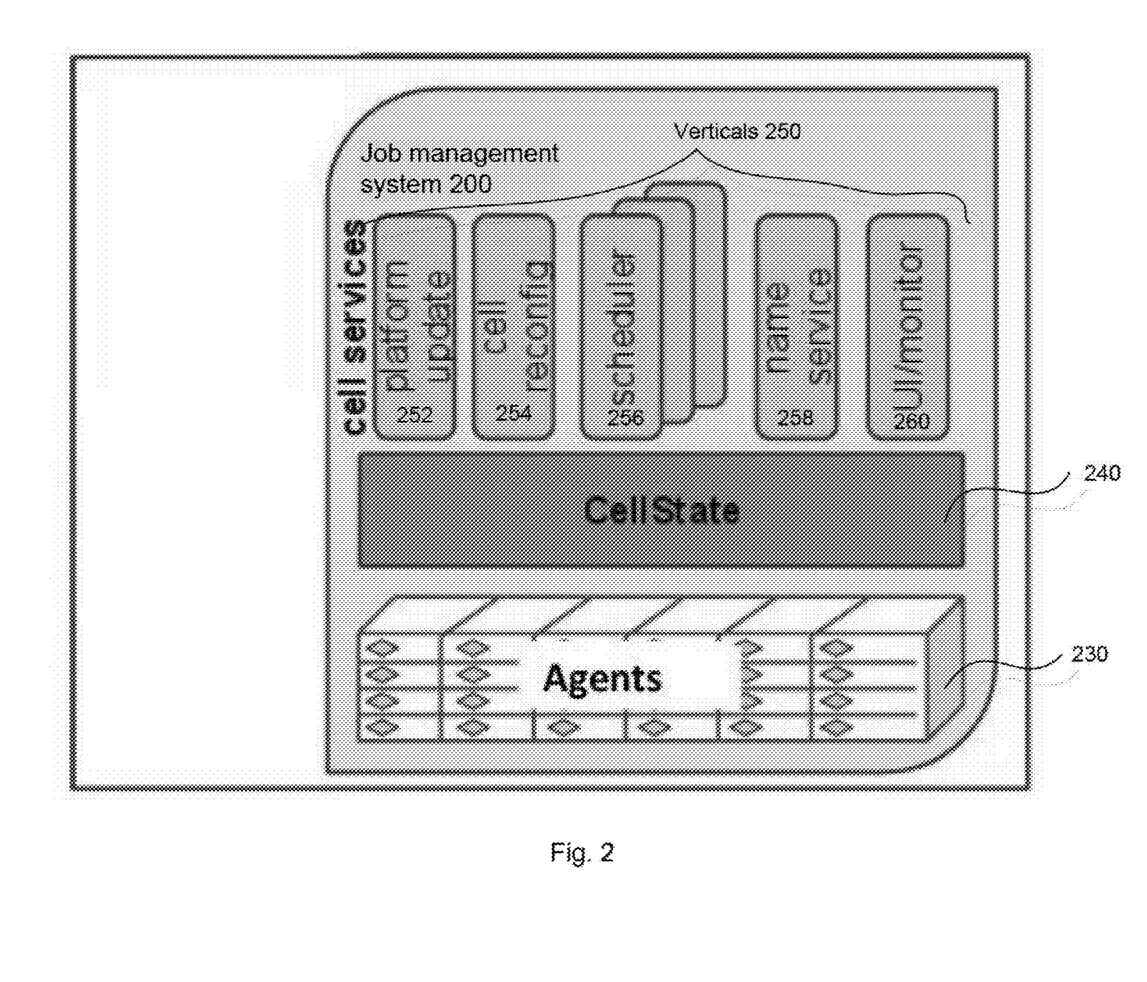
FIG. 2 is a block diagram of an example job management system according to aspects of the disclosure.

FIG. 2 illustrates an example job management system 200. The system 200 may be responsible for managing jobs submitted to a given cell in a cluster. The system 200 may reside in the cell, for example, on one or more machines in the cell or on a dedicated computer. The system 200 may communicate with one or more external entities outside the cell, such as an external machine database, a distributed lock manager, and a domain name system (DNS). The machine database may provide or accept information about the machines and resources in the cell or cluster. The distributed lock manager may be used to synchronize access to shared resources. The DNS may be used to translate names into IP addresses.

The system 200 may include agents 230, which orchestrate actions on the machines 130 in the cell managed by the system 200. The agents 230 may provide low-latency support start, stop, suspend, resume tasks and disruption activities, such as reboots deactivation of hardware components (e.g., magnetic disks), etc.

The system 200 may further include a CellState 240. The CellState 240 may store descriptions of the machines 130 managed by the system 200. Such descriptions may include, for example, machine capacity (e.g., memory, CPU, disk), software characteristics (e.g., which version of an operating system the machine is running, which version of Basic Input Output System (BIOS) the machine is running, etc.), or any attribute or label that differentiates the machine from other machines. The CellState 240 may further store a current assignment of work for those machines 130. In this regard, the CellState 240 may include a memory, such as a RAM, cache, removable memory device, or the like. The memory may be non-volatile in the form of persistent storage, such as disk drives, solid state disks, etc. According to some aspects, the CellState 240 may further include a processing component in communication with the memory. According to other aspects, the CellState may be manifested as a separate service, or a passive CellState, with the "service" part of it distributed amongst its clients.

The CellState 240 may also be responsible for making the stored information available to other component services in the job management system 200. Moreover, the CellState 240 may be responsible for acquiring and updating state information from the agents 230. Yet another function of the CellState 240 may be to record decisions made by schedulers, such as the schedulers in verticals 256 discussed in further detail below. For example, the CellState 240 may support idempotent operations, such as "apply this change only if this other state has these values." In this regard, a scheduler vertical 256 may operate on a cached copy of CellState data without concern that changed will be misapplied because of stale data.

The job management system 200 may further include one or more verticals 250. The verticals 250 may be clients of the CellState 240 that encapsulate major policy choices. A vertical may be anything that reads or writes data to and from CellState. A vertical may be implemented as a software component running as a computer process, which may be in the cell it is managing or elsewhere. Different verticals may provide different capabilities and policy choices. Examples of some verticals 250 include a platform update 252, cell configuration 254, schedulers 256, name service 258, and user interface/monitor 260. The main elements and responsibilities of a vertical 250 may be: collection management for tracking jobs, allocations, and equivalents; scheduling for binding elements of collections (e.g., tasks) to resources; admission control for deciding whether a submitted piece of work (e.g., job) is going to be given resources in a timely fashion; and babysitting, which may provide recovery and restart operations for work handled by the vertical. Any vertical that can modify cell state is called a "scheduler vertical".

The scheduler verticals 256 may each include one or more schedulers, for example, for performing different types of scheduling. For example, as discussed in further detail below, the scheduler verticals 256 may include a first scheduler vertical for assigning jobs quickly, and a second scheduler vertical for assigning jobs more carefully. According to another aspect discussed below, the scheduler verticals may include a job scheduler for scheduling tasks and a disruption scheduler for scheduling planned system disruptions.

Conventional scheduler designs tend to be monolithic, using a single algorithm to place tasks of a job onto machines. That algorithm can incorporate many different kinds of inputs, but complexity increases when this is done. Because it's a single algorithm, constructing fast-paths through it is difficult, and changing policies (e.g., to do something different for short jobs and long ones) is complicated because this could potentially affect all kinds of jobs. Because most schedulers are monolithic, it's harder to allow multiple, concurrent schedulers to operate at the same time. As a result, a short job requiring fast turnaround time may get stuck behind a slow decision for a job that is complicated to place ("head-of-line blocking").

According to aspects of this disclosure, using multiple scheduler verticals may address these problems. For example, multiple independent schedulers can operate concurrently, and permit independent development of the schedulers. Moreover, the multiple schedulers may use a shared state to represent information about the cell on which they are operating. Further, optimistic concurrency control may permit overlapped execution of schedulers and reconcile clashes, as explained in further detail below. Even further, additional services such as admission control and client-specific application program interfaces (API) can be provided by different scheduler verticals. For example, admission control may be used to notify clients of the scheduler verticals that the machines 130 are too busy to accept work, and request that the work be rescheduled at another time. As examples of client-specific APIs, a batch scheduler might provide an interface for a client to ask for a job to be completed by a specific deadline, or a service-job-oriented API might allow the client to specify the desired availability of the service. Alternatively or additionally, the client API could be provided by a common front-end that routes work to the different scheduler verticals.

Figure 3:
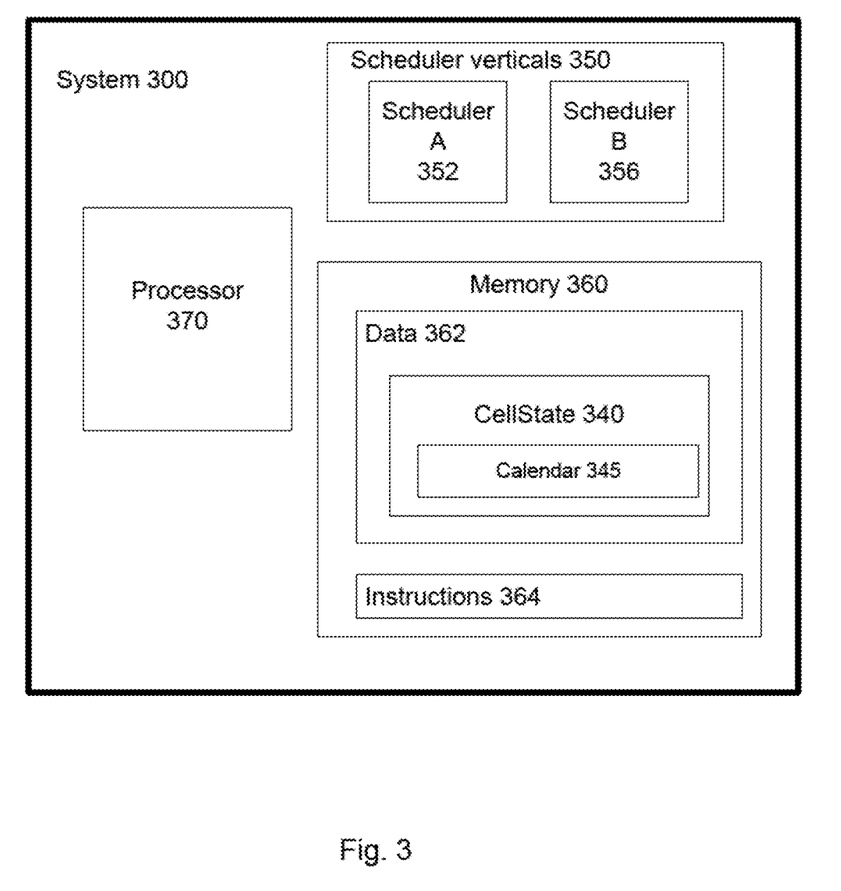
FIG. 3 is a block diagram of an example system including multiple scheduler verticals according to aspects of the disclosure.

FIG. 3 illustrates an example system 300 including multiple scheduler verticals 350, where the multiple scheduler verticals 350 use a shared state to represent information about the cell they are operating on and also use optimistic concurrency control.

As shown in FIG. 3, the system 300 may include a processor 370 in communication with a memory 360. Memory 360 stores information accessible by processor 370, including instructions 364 that may be executed by the processor 370. Memory also includes data 362 that may be retrieved, manipulated, or stored by the processor, such as copies of previously downloaded content. The memory may be of any type capable of storing information accessible by the processor, such as solid state storage, a solid-state drive (SSD), a hard-drive, memory card, ROM, RAM, DVD, CD-ROM, write-capable, and read-only memories. The memory 360 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. The memory 360 can be local or remote, private or shared. Systems and methods may include different combinations of the foregoing, whereby different portions of the instructions and data are stored on different types of media.

The memory 360 may further include CellState 340, which may be similar to the CellState 240 described above with respect to FIG. 2. The CellState 340 may further store a calendar 345. The CellState 340 and the calendar 345 may be accessible by each of the scheduler verticals 350. The calendar 345 may be used to store information regarding tasks and other events scheduled on one or more machines. According to one example, each machine in the cluster may have a corresponding calendar in the CellState 340. In this regard, the CellState may store any number of calendars 345, each being accessible by any or all of the verticals 350.

The instructions 364 may be any set of instructions to be executed directly (such as machine code) or indirectly (such as scripts and bytecode) by the processor. The instructions may be stored in object code format for direct processing by the processor, or in any other computer language including scripts or collections of independent source code modules that are interpreted on demand or compiled in advance or a mix thereof. Functions, methods and routines of the instructions are explained in more detail below.

Data 362 may be retrieved, stored or modified by processor 370 in accordance with the instructions 364. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The processor 370 may be any conventional processor. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

Although FIG. 3 functionally illustrates the processor and memory as being within the same block, the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel. Moreover, while elements such as CellState 340 are shown as being included in the memory 360, such elements may be separate components including their own memories and/or processors.

The scheduler verticals 350 may include any number of verticals, and each of the verticals 350 may include one or more schedulers. The schedulers may each perform a different scheduling function. As shown in FIG. 3, the scheduler verticals 350 include at least scheduler vertical A 352 and scheduler vertical B 356. Each scheduler vertical 352, 356 may access information regarding tasks scheduled on any machine in the cluster. For example, each scheduler may see jobs scheduled on any machine in the cluster, and may also be capable of scheduling additional events for any machine in the cluster.

According to the example of FIG. 3, all resource-allocation decisions may take place in the scheduler verticals 350. The CellState 340 may maintain master copy of all resource allocations in the cluster. Each scheduler vertical 352, 356 may be given a private, local, frequently-updated copy of CellState 340 that it uses for making scheduling decisions. The vertical can see the entire state of the cell, and has complete freedom to lay claim to any available cluster resources if it has the appropriate permissions and priority—even resources that another vertical has already acquired. For example, scheduler vertical A 352 may schedule a higher priority task on a given machine despite that a lower priority task was scheduled on the given machine by scheduler vertical B 356 at the same time. In that sense, the multiple scheduler verticals 352, 356 may "compete" for shared resources.

Once a vertical makes a scheduling decision, the resulting changes are pushed out to the master copy of CellState. In some examples, such an update transaction may be atomic. For example, it may be selected whether to commit all of the changes or none, or to commit just some (e.g., the ones with no conflicts). The atomicity property may be disabled when scheduling work onto multiple machines to allow incremental scheduling of the tasks in a job. Within a single machine, however, atomicity may be employed such that all of the changes to one machine are accepted or none. Because both scheduler vertical A 352 and scheduler vertical B 356 may be scheduling events on the same machines at the same time, a scheduling conflict may occur (e.g., multiple tasks may be scheduled on one machine for a same time, thereby overloading that machine). Such conflicts may be reconciled using optimistic concurrency control. For example, in the event of a conflict, at most one atomic update transaction will succeed. For example, software associated with CellState may be executed by the processor 370 to determine whether a transaction succeeds. The determination may be based on, for example, which of the conflicting transactions was submitted first (e.g., based on a logical or physical clock. If multiple transactions were submitted at the same time, then the higher-priority transactions could be given earlier timestamps so that they would be committed while the lower priority transactions would be rejected. Whether or not a transaction succeeds, the scheduler vertical performing the transaction will resync its local copy of CellState. If all or part of the update transaction failed, for example because of a conflict, the scheduler vertical may re-run its scheduling algorithm and try again.

As mentioned above, the scheduler verticals 352, 356 operate in parallel and do not have to wait for other jobs in other verticals to be scheduled (i.e., no inter-scheduler head of line blocking). According to one example, conflicts may be reduced by using incremental transactions for transactions that attempt to make several changes, which accept all but the conflicting changes. According to another example, a scheduler may choose to break up a large change into several smaller transactions, each of which is less likely to experience a conflict. According to another example, "gang scheduling" may be used, where either all tasks of a job are scheduled together, or none are, and the scheduler vertical will try again to schedule the entire job.

According to one example, the multiple scheduler verticals 350 may be used to schedule tasks in different manners. For example, where a system includes at least two schedulers, a first scheduler (e.g., a "batch" scheduler) may execute decisions quickly as to how to allocate tasks and jobs among machines. A second scheduler (e.g., a "service" scheduler) may execute decisions slower than the first scheduler but with better placement characteristics (e.g., fewer disruptions, better bin-packing of resources). For example, while the second scheduler may take longer to make allocation decisions, the machines running the tasks allocated by the second scheduler may be less likely to be overburdened or have scheduling conflicts.

Continuing the example of the service scheduler and the batch scheduler with reference to FIG. 3, the scheduler vertical 352 may include the batch scheduler while the scheduler vertical 356 includes the service scheduler. Decisions regarding which scheduler to submit a job to may be made by a user, a client device, the processor 370, an interface in communication with the verticals, or the like. Such decisions may be based on, for example, a required run time for a task, a number of machines needed to run the task, or any other criteria.

Figure 4:
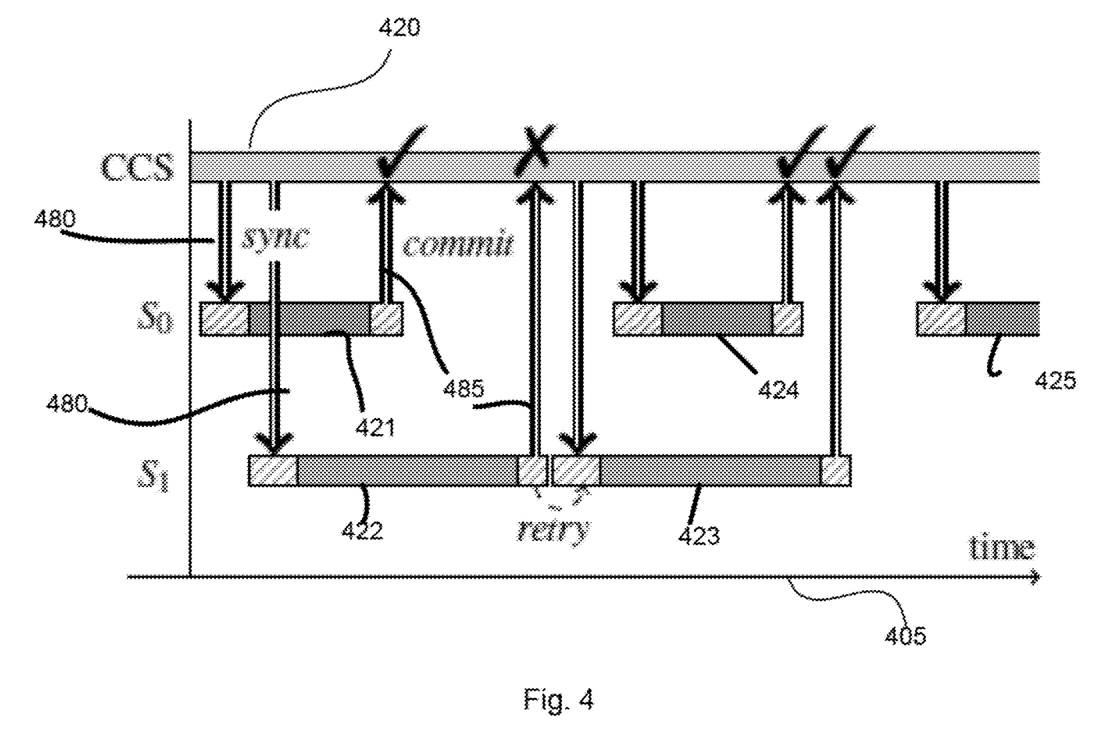
FIG. 4 is a diagram illustrating an example of shared state scheduling in a multiple scheduler vertical system using optimistic concurrency control according to aspects of the disclosure.

FIG. 4 provides an example of shared-state scheduling using optimistic concurrency control. The horizontal axis 405 represents time. The bars 420-425 represent different copies of the CellState. The master copy of the CellState is represented by the bar 420 at the top. The copies 421, 424, 425 are in first scheduler S0, which may be a batch scheduler. The copies 422, 423 are in second scheduler S1, which may be the service scheduler. The downward arrows 480 from the master copy 420 to each of the schedulers may represent a time when the copies 421-425 are obtained by the schedulers S0 and S1. The upward arrows 485 represent update transactions attempted by the schedulers S0 and S1. As shown, the times between obtaining copies and performing update transactions for the batch scheduler S0 (e.g., indicated by a length of the bars 421, 424, 425) are much shorter than the times for the service scheduler S1. This is because the service scheduler S1 takes more time to make allocation decisions prior to updating the CellState. As a result, some update transactions attempted by the service scheduler S1 may fail and must be retried (e.g., bar 423).

The present multi-scheduler design is advantageous in that it allows development to proceed independently. For example, it permits rapid deployment of new approaches. Moreover, it allows concurrent execution of schedulers, which in turn permits scale-up and avoids head-of-line blocking of one request behind another slow one.

The job management system 200 of FIG. 2 may include further scheduling features. For example, typically a cluster will have many events that are disruptive to its jobs, such as hardware outages, operating systems upgrades, and firmware upgrades. During such disruptions, tasks will typically be killed. While a scheduler associated with the cluster may eventually fix problems caused by the disruption, the cluster will suffer degraded performance until this occurs.

Many disruptions can be planned ahead of time. The job management system 200 may provide a way to reduce the impact of planned disruptions. For example, the CellState 240 may further store a calendar representing which resources are being used by which tasks or disruptions at a given time. The system 200 may include one or more "disruption schedulers" and one or more "job schedulers." The disruption schedulers may enter disruptions in the calendar, and the job schedulers may enter tasks for particular jobs. By planning disruptions in this way, scheduling of tasks and disruptions may be coordinated so as to reduce the impact of disruptions on tasks, as well as reducing the overall latency of performing the disruptions.

Figure 5:
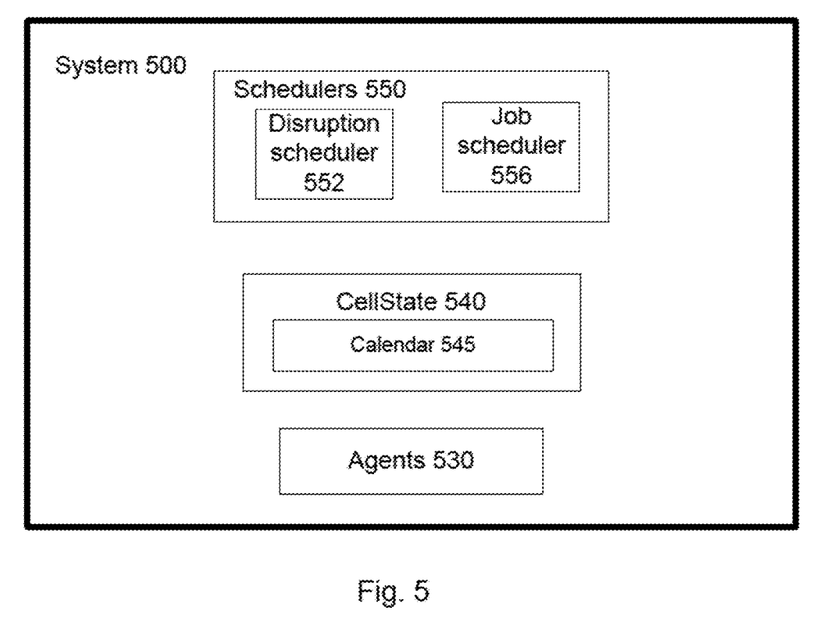
FIG. 5 is a block diagram of another example system according to aspects of the disclosure.

FIG. 5 illustrates an example management system 500 for reducing the impact of planned disruptions. The system 500 may include multiple schedulers 550, including one or more disruption schedulers 552 and one or more job schedulers 556. The schedulers 550 may communicate with CellState 540 and agents 530, which may be similar to the CellState 240 and agents 230 described with respect to FIG. 2. Moreover, similar to FIG. 3, the schedulers 550 and CellState 540 may include or be in communication with a processor. Moreover, the schedulers 550 and CellState 540 may be included in any type of memory, such as a computer-readable medium.

Figure 6:
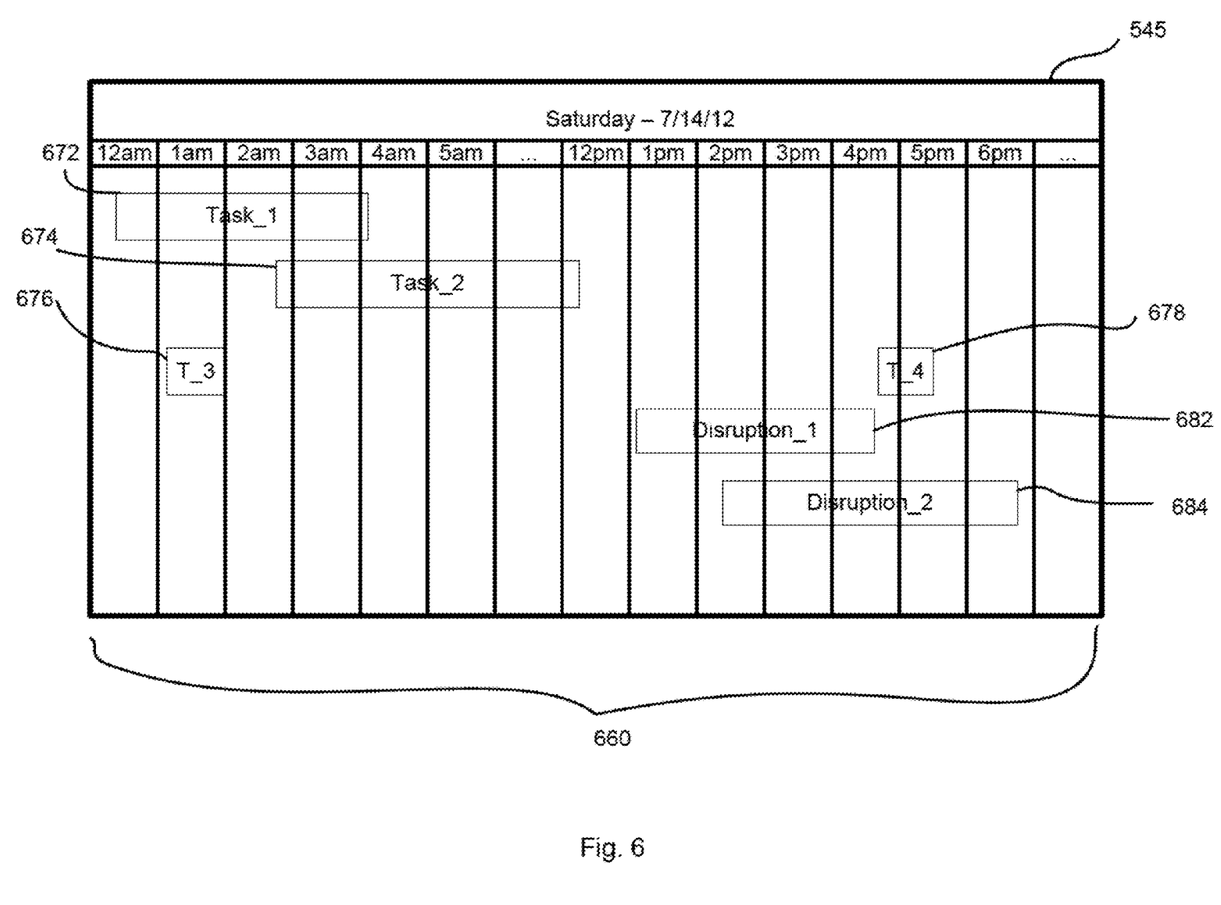
FIG. 6 illustrates an example calendar according to aspects of the disclosure.

The CellState 540 may store a calendar 545 accessible by the schedulers 550. An example of the calendar 545 is provided in FIG. 6. As shown in FIG. 6, a given period of time may be subdivided into a plurality of narrower ranges 660. For example, the day of Saturday, Jul. 14, 2012 may be subdivided into twenty four hourly ranges 660. According to another example, the given time period may be divisible into tiny discrete ranges (e.g., nanoseconds or seconds), or may not be subdivided at all and may rather use arbitrary start times for scheduled events. Any number of events, such as tasks and disruptions, may be scheduled. For example, as shown various tasks 672, 674, 676, 678 are scheduled, as well as various disruptions 682, 684. According to one example, the calendar 545 may include entries relating to each machine of the agents 530. According to another example, a plurality of calendars may be stored in the CellState 540, with each calendar corresponding to one or more machines. While the example of FIG. 6 only shows one particular time period (e.g., the day of Jul. 14, 2012), the calendar 545 may include a schedule of tasks and disruptions over any period of time, such as minutes, hours, days, weeks, months, etc. Similarly, such time period may be broken down in any increments. For example, tasks and disruptions may be scheduled in seconds or microseconds, as opposed to being scheduled with reference to hours as shown in FIG. 6.

The tasks 672-678 may be scheduled by the job scheduler 556 of FIG. 5, for example, based on capacity required to perform the tasks, available capacity of the agents 530, a length of time for which the tasks are expected to run, priority of the tasks, etc. According to one example, entries in the calendar 545 associated with the scheduled tasks 672-674 may identify particular machines to perform the tasks.

The disruptions 682, 684 may be scheduled by the disruption scheduler 552 of FIG. 5. The disruptions may be scheduled, for example, based on the scheduled tasks 672-678. For example, the disruption scheduler 552 may identify times when a resource to be disrupted is idle or only running low importance tasks, and may schedule the disruptions 682, 684 during those times. According to another example, the disruption scheduler 552 may schedule disruptions prior to the scheduling of any tasks, so that tasks can be scheduled around planned disruptions. In yet another example, the disruption scheduler 522 may schedule disruptions only when the tasks signal that they can best withstand the disruption, e.g., when they will least affect their users or clients, or when the amount of rework required will be minimal (such as just after a checkpoint to persistent storage), or when the relative importance of the task has diminished. Conversely, the disruption scheduler 522 may explicitly avoid scheduling disruptions when one or more opposite conditions prevail, such as the presence of high-importance tasks, or when clients or users may be disrupted, or if data might be lost (e.g., if the task was part of a distributed storage system), or if a large amount of work would have to be re-done.

The information in the calendar 545 regarding planned disruptions 682, 684 may be used to pre-plan a response of a job or scheduler. Example responses can include not placing a task to overlap a disruption, or starting up a new copy of a disrupted task in sufficient time for the task to be completed when needed. Further examples include requesting (implicitly or explicitly) that the planned disruption be rescheduled, or creating additional tasks to act as failover mechanisms (e.g., "hot spares"). Information regarding a quantity of planned disruptions may be used to determine how many additional "hot spares" should be created, not just whether they should be allocated.

The information in the calendar 545 regarding planned disruptions 682, 684 may also be used to coalesce multiple disruptive events together into one. For example, if an operating system upgrade and a BIOS upgrade are both required, both disruptions may be scheduled during a same or overlapping time period, or in two abutting time periods, or in two time periods with a small gap between them.

Figure 7:
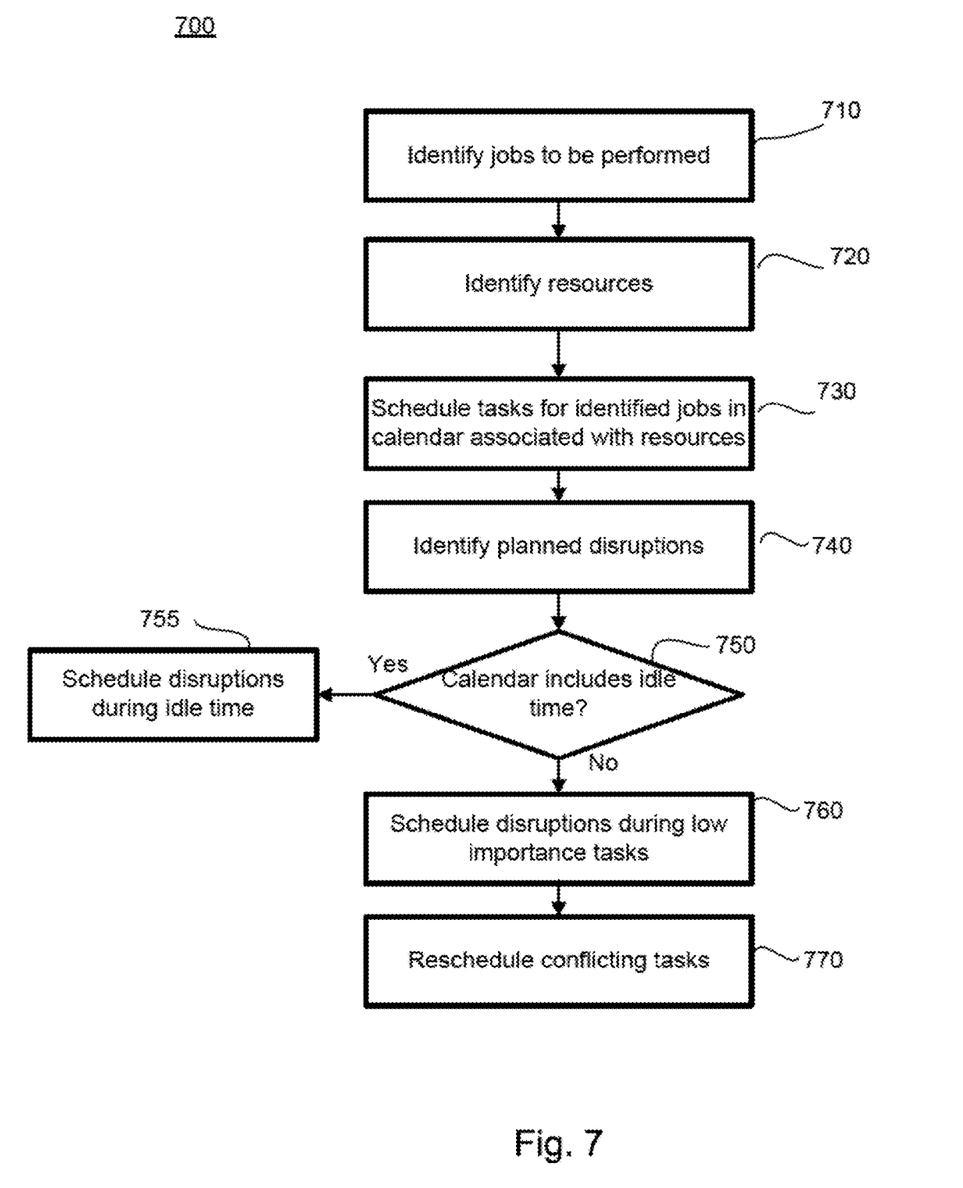
FIG. 7 is a flow diagram of an example method of scheduling disruptions according to aspects of the disclosure.

FIG. 7 illustrates an example method 700 for scheduling planned disruptions for one or more resources. The resources may be individual machines, racks, clusters, cells, or any other grouping of computing machines. While the description below refers to a number of blocks of the method 700 in a particular order, it should be understood that the order in which the blocks are performed may be modified, some blocks may be performed concurrently, and blocks may be added or omitted.

In block 710, jobs to be performed may be received by a job scheduler or by a dispatcher that allocates jobs to schedulers. The identification of jobs to be performed may include determining a required capacity for performing tasks included in the job, an approximate run time for the tasks, a priority of the tasks, an explicit identification of the desired scheduler or the scheduler type, etc. According to one aspect, a plurality of jobs may be load-balanced among multiple job schedulers.

In block 720, resources to perform the jobs may be identified. The resources may be, for example, one or more computing machines in a rack, cell, cluster, building, site, region, etc. The identified resources may be associated with a calendar. Accordingly, the tasks of the identified jobs may be scheduled in the calendar (block 730).

In block 740, planned disruptions may be received by a disruption scheduler. Upon receiving the disruptions, the disruption scheduler may determine, for example, how long each disruption may take, how soon the disruption is needed, whether the disruption is likely to be associated with another disruption (e.g., a disruption to upgrade an operating system may be associated with a disruption to upgrade firmware), etc.

In block 750, it may be determined whether the calendar includes times at which the resources are idle. For example, it may be determined if there is a time where no tasks are scheduled for a duration longer than a predicted length of disruption time. If the calendar includes an idle time in which a disruption may be scheduled without impacting tasks, the disruption may be scheduled during that idle time (block 755) and therefore not disrupt any task.

If the calendar does not include sufficient idle time within which to schedule a disruption, disruptions may be scheduled for other times in block 760. For example, the disruptions may be scheduled to conflict with only lower importance tasks, or during times which overlap only a small percentage of a run time of a task, or during times that impose the minimum negative impact on the tasks. According to some examples, however, disruptions may be scheduled at non-idle times even if idle times are available.

In block 770, tasks conflicting with the scheduled disruption may be rescheduled. For example, these tasks may be scheduled for a different time or scheduled onto a different resource.

Scheduling planned disruptions as discussed above may be advantageous in reducing an impact of disruptions on scheduled tasks. For example, as opposed to tasks being terminated by a disruption and having to be restarted after the disruption is over, the tasks may be scheduled so as not to conflict with the disruption. Moreover, provisions may be made to protect against failure of tasks. For example, backup tasks may be scheduled for different times or on different machines. Even further, multiple disruptions may be scheduled for a same time, thereby reducing overall downtime of resources.

Although the present disclosure makes reference to particular examples, it should be understood that these examples are merely illustrative of the principles and applications of the subject matter of the claims. For example, it should be understood that the described system and method may be implemented over any type of database or other network. Additionally, it should be understood that numerous other modifications may be made to the illustrative examples. However, these and that other arrangements may be devised without departing from the spirit and scope of the subject matter defined by the appended claims.

The invention claimed is:

1. A system, comprising: a batch scheduler vertical;
a service scheduler vertical; and
a memory accessible by the batch scheduler vertical and the service scheduler vertical, the memory storing an assignment of work for machines;
wherein the batch scheduler vertical is in communication with one or more processors and programmed to:
access the memory;
determine timeslots for scheduling a first set of tasks; and schedule the first set of tasks in the determined timeslot;
wherein the service scheduler vertical is in communication with one or more processors and programmed to:
access the memory;
determine, concurrently with the batch scheduler vertical, timeslots for scheduling a second set of tasks; and
schedule the second set of tasks in the determined timeslot; and
reschedule conflicting tasks that conflict with the any of the first set of tasks scheduled by the batch scheduler vertical;
wherein the batch scheduler vertical is configured to execute decisions regarding allocation of tasks among machines more quickly than the service schedule vertical, and the service scheduler vertical is configured to execute decisions regarding allocation of tasks with better placement characteristics than the batch scheduler vertical.

2. The system of claim 1, wherein in scheduling the first set of tasks the batch scheduler vertical is further configured to:
receive a first copy of the assignment of work for the machines from the memory at a first time; and
commit to the memory a first additional task at a second time.

3. The system of claim 2, wherein in scheduling the second set of tasks the services scheduler vertical is further configured to:
receive a second copy of the assignment of work for the machines from the memory at a third time;
commit to the memory a second additional task at a fourth time.

4. The system of claim 3, wherein an amount of service scheduler vertical scheduling time between the third time and the fourth time is greater than an amount of batch scheduler vertical scheduling time between the first time and the second time.

5. The system of claim 3, wherein:
if the third time at which the service scheduler vertical receives the second copy of the assignment of work is between the first time and the second time, the second copy of the assignment of work is the same as the first copy of the assignment of work.

6. The system of claim 5, wherein:
if the service scheduler vertical fails to commit the second additional task based on a conflict, the services scheduler vertical:
receives a third copy of the assignment of work from the memory subsequent to the fourth time;
determines a new timeslot for the second additional task; and
subsequently commits to the memory the second additional task.

7. The system of claim 1, wherein the one or more processors are configured to:
receive a request for a given task; and
determine whether to assign the given task to the batch scheduler vertical or the services scheduler vertical.

* * * * *